United States Patent
Mizuno et al.

(10) Patent No.: US 6,684,627 B2
(45) Date of Patent: Feb. 3, 2004

(54) METHOD OF PURIFYING EXHAUST GAS FROM INTERNAL COMBUSTION ENGINE

(75) Inventors: Tatsuji Mizuno, Yokohama (JP); Shinji Tsuji, Numazu (JP); Masahiko Takeuchi, Susono (JP); Kenji Kato, Sunto-gun (JP); Takaaki Ito, Mishima (JP); Yoshitsugu Ogura, Toyota (JP); Tetsuo Kawamura, Susono (JP); Mareo Kimura, Nagakute-cho (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 78 days.

(21) Appl. No.: 09/860,481

(22) Filed: May 21, 2001

(65) Prior Publication Data

US 2001/0047653 A1 Dec. 6, 2001

(30) Foreign Application Priority Data

| | | |
|---|---|---|
| May 26, 2000 | (JP) | 2000-161152 |
| Oct. 13, 2000 | (JP) | 2000-314025 |
| Oct. 13, 2000 | (JP) | 2000-314029 |
| Oct. 13, 2000 | (JP) | 2000-314035 |
| Oct. 13, 2000 | (JP) | 2000-314039 |
| Oct. 13, 2000 | (JP) | 2000-314049 |
| Oct. 13, 2000 | (JP) | 2000-314056 |

(51) Int. Cl.⁷ ............................................. F01N 3/00
(52) U.S. Cl. .............. 60/274; 60/295; 60/297; 60/303; 60/311; 423/213.2; 423/243.07; 423/243.08; 423/244.06; 423/244.07
(58) Field of Search ............... 60/274, 278, 286, 60/295, 297, 301, 303, 311; 55/DIG. 30; 44/354, 358, 359, 364; 422/168, 172, 177; 423/210, 213.2, 213.5, 243.07, 243.08, 244.06, 244.07; 110/203

(56) References Cited

U.S. PATENT DOCUMENTS

| | | | | |
|---|---|---|---|---|
| 3,948,617 A | * | 4/1976 | Withorn | 44/354 |
| 5,266,083 A | * | 11/1993 | Peter-Hoblyn et al. | 44/358 |
| 5,575,983 A | * | 11/1996 | Suzuki et al. | 423/213.5 |
| 5,585,081 A | * | 12/1996 | Chu et al. | 423/244.07 |
| 5,658,547 A | * | 8/1997 | Michalak et al. | 423/243.08 |
| 5,792,436 A | | 8/1998 | Feeley et al. | |
| 5,967,061 A | * | 10/1999 | Ashworth et al. | 110/203 |
| 6,003,303 A | * | 12/1999 | Peter-Hoblyn et al. | 60/274 |
| 6,010,673 A | * | 1/2000 | Kanazawa et al. | 423/213.5 |
| 6,023,928 A | * | 2/2000 | Peter-Hoblyn et al. | 60/274 |

(List continued on next page.)

FOREIGN PATENT DOCUMENTS

| | | | |
|---|---|---|---|
| EP | 0582917 A | | 2/1994 |
| EP | 0815925 A1 | | 1/1998 |
| EP | 0891806 A | | 1/1999 |
| GB | 2248068 | * | 3/1992 |
| JP | 53-39965 | | 4/1978 |

(List continued on next page.)

Primary Examiner—Thomas Denion
Assistant Examiner—Tu M. Nguyen
(74) Attorney, Agent, or Firm—Oliff & Berridge, PLC (57) ABSTRACT

The present invention is a method of solidifying sulfur component being the cause of "SOx poisoning" by use of a sulfur solidifier. The solidifier includes a metal element having a function of oxidizing the sulfur component and a basic metal element. And the solidifier solidifies sulfur component before exhaust gas flows into an NOx-occluding reduction-type exhaust purifying catalyst located on an exhaust path. Since the foregoing sulfur solidifier includes the above metal element and the basic metal element, it can effectively solidify the sulfur component which are the cause of the SOx poisoning, and ensure improvement in purification performance.

20 Claims, 7 Drawing Sheets

U.S. PATENT DOCUMENTS

| | | | | |
|---|---|---|---|---|
| 6,060,030 | A | * 5/2000 | Schwab et al. | 423/210 |
| 6,117,405 | A | * 9/2000 | Frey et al. | 423/244.07 |
| 6,293,096 | B1 | * 9/2001 | Khair et al. | 60/286 |
| 6,296,822 | B1 | * 10/2001 | Hepburn et al. | 423/213.5 |
| 6,338,831 | B1 | * 1/2002 | Strehlau et al. | 423/244.07 |

FOREIGN PATENT DOCUMENTS

| | | | |
|---|---|---|---|
| JP | | 63-141629 | * 6/1988 |
| JP | A | 63-242324 | 10/1988 |
| JP | | 5-26030 | * 2/1993 |
| JP | | 6-159037 | * 6/1994 |
| JP | | 6-272537 | * 9/1994 |
| JP | A | 9-94434 | 4/1997 |
| JP | A | 11-47536 | 2/1999 |
| JP | A | 2000-27712 | 1/2000 |
| JP | A | 2000-73743 | 3/2000 |

* cited by examiner

METHOD OF PURIFYING EXHAUST GAS FROM INTERNAL COMBUSTION ENGINE

BACKGROUND OF THE INVENTION

1. Field of the Invention

The present invention relates to an exhaust gas purifying method of internal combustion engine capable of suppressing degradation of exhaust purification efficiency of NOx-occluding reduction-type exhaust purifying catalysts due to SOx poisoning and thereby achieving higher purification efficiency of exhaust gas.

2. Related Background Art

The exhaust gas from an internal combustion engine is purified by an emission purifying catalyst such as a three way catalyst and then discharged to the atmosphere. The NOx-occluding reduction-type exhaust purifying catalysts have been also used as a kind of such exhaust purifying catalysts. The NOx-occluding reduction-type exhaust purifying catalysts are catalysts that occlude nitrogen oxides [NOx] under an excess condition of oxygen [$O_2$] in exhaust gas but release the occluded NOx under a low-content condition of $O_2$ in exhaust gas to effect reduction thereof (whereupon carbon monoxide [CO] and hydrocarbons [HC] in the exhaust gas are oxidized).

The exhaust purification efficiency can be increased more when such NOx-occluding reduction-type exhaust purifying catalysts are used so as to occlude NOx in exhaust gas during lean operation but release and reduce the occluded NOx during stoichiometric or rich operation. These NOx-occluding reduction-type exhaust purifying catalysts are useful in increasing the exhaust purification efficiency of lean-burn engines, which are designed positively to employ the lean operation as against ordinary engines, and thus they are also contributing to improvement in fuel consumption.

SUMMARY OF THE INVENTION

These NOx-occluding reduction-type exhaust purifying catalysts have the nature of occluding sulfur oxides [SOx] more stably than NOx. The SOx in exhaust gas are produced by oxidation of sulfur component included in fuel or engine oil, during combustion in the internal combustion engine. Although the quantity of sulfur component is very small in fuel or engine oil, the amount of sulfur component occluded becomes gradually increasing as accumulated in the catalyst, because it is stably occluded in the NOx-occluding reduction-type exhaust purifying catalysts. Once the NOx-occluding reduction-type exhaust purifying catalysts occlude a lot of SOx, they will disable the proper occlusion and release-reduction of NOx. This is the so-called "SOx poisoning" in the NOx-occluding reduction-type exhaust purifying catalysts.

In the conventional NOx-occluding reduction-type exhaust purifying catalysts, most of occlusion capacity in mint condition is applied to the occlusion of NOx, whereas after the SOx poisoning only small part of occlusion capacity is applied to the occlusion of NOx. If this SOx poisoning is suppressed, it will become feasible to increase the occlusion capability and release capability of NOx and greatly enhance the exhaust purifying performance of the NOx-occluding reduction-type exhaust purifying catalysts. There are known techniques for suppressing the SOx poisoning of the NOx-occluding reduction catalysts, e.g., one described in Japanese Patent Application Laid-Open No. 2000-27712, but its effect is not satisfactory yet. The inventors conducted research toward further improvement in the exhaust purification performance and accomplished the present invention.

It is, therefore, an object of the present invention to provide an exhaust purifying method of internal combustion engine capable of suppressing the SOx poisoning of NOx-occluding reduction-type exhaust purifying catalysts, thereby further increasing the purification efficiency of exhaust gas.

The present invention is a method of purifying exhaust gas from an internal combustion engine, wherein by use of a sulfur solidifier comprising a metal element having a function of oxidizing sulfur component, and a basic metal element, the sulfur component being the cause of SOx poisoning is solidified before the exhaust gas flows into an NOx-occluding reduction-type exhaust purifying catalyst placed on an exhaust path.

According to the present invention, the sulfur solidifier solidifies the sulfur component (incl. sulfur oxides) before the exhaust gas flows into the NOx-occluding reduction-type exhaust purifying catalyst placed on the exhaust path, which can suppress the SOx poisoning of the NOx-occluding reduction-type exhaust purifying catalyst and further increase the purification efficiency of exhaust gas. A significant point here is that the aforementioned sulfur solidifier comprises the metal element having the function of oxidizing the sulfur component (incl. sulfur oxides), and the basic metal element. This permits the solidifier to effectively solidify the sulfur component (incl. sulfur oxides) being the cause of SOx poisoning of the exhaust purifying catalyst, which ensures the improvement in the purification performance.

It is preferable herein to preliminarily mix the sulfur solidifier in fuel. This premixing of the sulfur solidifier in fuel facilitates control of the ratio of the sulfur solidifier to fuel, thus contributing to increase in solidification efficiency of the sulfur component.

In another preferred embodiment, the sulfur solidifier can be added in an intake path, in a combustion chamber, or in the exhaust path, separately from the fuel. In this configuration, since the sulfur solidifier is added in the intake path, in the combustion chamber, or in the exhaust path separately from the fuel, it is feasible to select the position and timing of addition suitable for the solidification reaction and to adjust a loading amount according to the operational status of the internal combustion engine or the like (also including a situation where no load of the solidifier is desired), thus contributing to increase in the solidification efficiency of the sulfur component.

The metal element having the function of oxidizing the sulfur component (incl. sulfur oxides) in the sulfur solidifier, is preferably a transition element.

In another aspect, the basic metal element in the sulfur solidifier is preferably an alkali metal element or an alkaline earth metal element. The basic metal element being the alkali metal element or the alkaline earth metal element is prone to react with the sulfur component and form salts (solid matter), and is thus able to increase the solidification efficiency of the sulfur component.

Further, the basic metal element in the sulfur solidifier is preferably an alkali metal element having an atomic number equal to or higher than the atomic number of potassium. When the basic metal element is an alkali metal element having an atomic number equal to or higher than the atomic number of potassium, it is particularly easy to react with the sulfur component to form salts (solid matter), and thus is capable of further increasing the solidification efficiency of the sulfur component.

Further, it is preferable to make the solidified sulfur component held on the exhaust purifying catalyst and act as a catalytic component. When the solidified sulfur component is made to be held on the exhaust purifying catalyst and to act as a catalytic component in this way, the occlusion capability of the exhaust purifying catalyst can be maintained high. As a result, it is feasible to further enhance the exhaust purifying performance and suppress deterioration of the exhaust purifying catalyst.

When the sulfur solidifier is added to the intake air, air/fuel mixture, or recirculated exhaust gas before combustion in the cylinder of the internal combustion engine, it becomes feasible to adequately adjust the loading amount of the sulfur solidifier and adjust the loading timing. For example, when the sulfur solidifier is included in fuel, the loading amount and time of the sulfur solidifier are limited by injected fuel quantity and fuel injection timing. When the solidifier is added to the intake air, air/fuel mixture, or recirculated exhaust gas, it is feasible to effectively promote the solidification of the sulfur component (incl. sulfur oxides) under high temperature and high pressure conditions during combustion or immediately after combustion in the cylinder, which is convenient to increase in the solidification efficiency. On this occasion, the sulfur solidifier is added to the intake air, the air/fuel mixture, or the recirculated exhaust gas, on the intake path or to the recirculated exhaust gas on an exhaust gas recirculation path routed from the exhaust path to the intake path.

The sulfur solidifier preferably contains the basic metal in an amount greater than a chemical equivalent to the sulfur component to be solidified. This allows the sulfur component to be solidified efficiently.

Another exhaust purifying method of internal combustion engine according to the present invention is a method of purifying exhaust gas from an internal combustion engine, wherein upstream of an NOx-occluding reduction-type exhaust purifying catalyst placed on an exhaust path, sulfur component (incl. sulfur oxides) being the cause of SOx poisoning is solidified by a sulfur solidifier comprising a basic metal element and wherein the sulfur component solidified is made to be held on the exhaust purifying catalyst and to act as a catalytic component.

According to the present invention, the sulfur solidifier solidifies the sulfur component (incl. sulfur oxides) being the cause of SOx poisoning before the exhaust gas flows into the NOx-occluding reduction-type exhaust purifying catalyst placed on the exhaust path, which can suppress the SOx poisoning of the NOx-occluding reduction-type exhaust purifying catalyst and further increase the purification efficiency of exhaust gas. A significant point herein is that the solidified sulfur component is made to be held on the exhaust purifying catalyst and to act as a catalytic component, whereby the occlusion capability of the exhaust purifying catalyst can be maintained high. This permits further improvement in the exhaust purifying performance and suppression of deterioration of the exhaust purifying catalyst.

Here the exhaust purifying catalyst preferably has a wall flow structure. This structure makes it easier to uniformly carry the solidified sulfur component inside the exhaust purifying catalyst and to react the exhaust gas with the sulfur component functioning as a catalyst on the exhaust purifying catalyst, which can improve the purifying performance of exhaust gas.

After held on the exhaust purifying catalyst, the solidified sulfur component thereon is preferably placed under high temperature and rich conditions to make the basic metal element carried on the exhaust purifying catalyst. According to this aspect, the solidified sulfur component, after held on the exhaust purifying catalyst, is placed under the high temperature and rich conditions, so as to promote the carrying action of the basic metal onto the exhaust purifying catalyst and enhance the purification of exhaust by the basic metal thus carried on the exhaust purifying catalyst, which can further enhance the exhaust purifying performance.

In a preferred embodiment, an alkali metal element or an alkaline earth metal element is carried on the exhaust purifying catalyst, the basic metal element in the sulfur solidifier is an alkali metal element or an alkaline earth metal element, and the alkali metal element or the alkaline earth metal element in the sulfur solidifier is one having stronger basicity than the alkali metal element or the alkaline earth metal element carried on the exhaust purifying catalyst. In this embodiment, even if gaseous sulfur oxides remaining without being solidified newly flow into the exhaust purifying catalyst, they can be harder to couple with the alkali metal element or the alkaline earth metal element carried on the exhaust purifying catalyst from the beginning. As a result, the original NOx occlusion capability of the exhaust purifying catalyst is prevented from being degraded, and the initial performance of the exhaust purifying catalyst is maintained, so that the exhaust purifying performance can be maintained high.

In another preferred embodiment, an alkali metal element or an alkaline earth metal element is carried on the exhaust purifying catalyst, the basic metal element in the sulfur solidifier is an alkali metal element or an alkaline earth metal element, and the alkali metal element or the alkaline earth metal element in the sulfur solidifier is one easier to decompose than the alkali metal element or the alkaline earth metal element carried on the exhaust purifying catalyst. In this embodiment, during decomposition of NOx and SOx occluded in the exhaust purifying catalyst, the alkali metal element or the alkaline earth metal element becoming newly carried from the sulfur solidifier is first decomposed, which prevents a scattering phenomenon of the alkali metal element or the alkaline earth metal element carried on the exhaust purifying catalyst from the beginning. As a result, it is feasible to maintain the initial performance of the exhaust purifying catalyst and also maintain the exhaust purifying performance high.

A further exhaust cleaning method of internal combustion engine according to the present invention is a method comprising the steps of adding a sulfur solidifier for solidifying sulfur component, to exhaust gas after combustion in a cylinder of the internal combustion engine, to solidify the sulfur component (incl. sulfur oxides) being the cause of SOx poisoning and flowing the exhaust gas after solidification of the sulfur component into an NOx-occluding reduction-type exhaust purifying catalyst.

According to the present invention, the sulfur solidifier solidifies the sulfur component (incl. sulfur oxides) being the cause of SOx poisoning before the exhaust gas flows into the NOx-occluding reduction-type exhaust purifying catalyst placed on the exhaust path, which can suppress the SOx poisoning of the NOx-occluding reduction-type exhaust purifying catalyst and further increase the purification efficiency of exhaust gas. A significant point herein is that the aforementioned sulfur solidifier is added to the exhaust gas after the combustion in the cylinder of the internal combustion engine. This eliminates a need for concern about whether the solidified sulfur component can cause knocking or combustion failure. As a result, it becomes feasible to bring about effective solidification of sulfur component (incl. sulfur oxides) that can be the cause of SOx poisoning of the exhaust purifying catalyst, to ensure improvement in the purifying performance, and also to ensure stable operation of the internal combustion engine.

It is preferable herein to place an oxidation catalyst upstream of the exhaust purifying catalyst on the exhaust path and add the sulfur solidifier to the exhaust gas between the oxidation catalyst and the exhaust purifying catalyst. In this configuration, the sulfur component is oxidized from $SO_2$ to $SO_3$ by the oxidation catalyst and thereafter solidified, which can increase the solidification efficiency of sulfur component.

DESCRIPTION OF THE PREFERRED EMBODIMENTS

Figure 1:
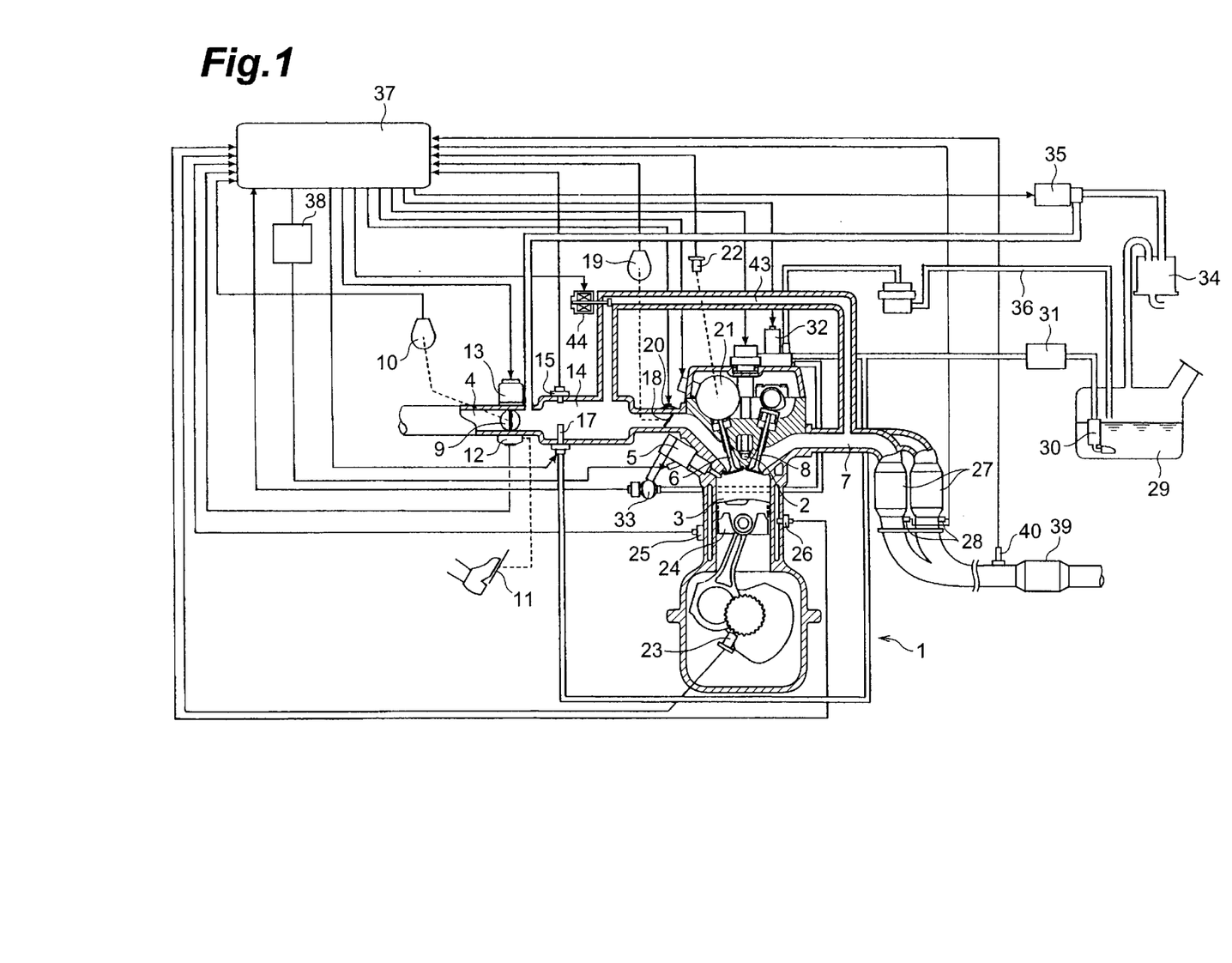
FIG. 1 is a drawing to show the structure of the internal combustion engine and surroundings thereof for carrying out an exhaust purifying method of the present invention (to mix the solidifier into fuel).

An embodiment of the exhaust purifying method of the present invention will be described below. FIG. 1 shows an internal combustion engine 1 having a purifying system for carrying out the purifying method of the present embodiment.

The engine 1 described below is a multi-cylinder engine, but only one of its cylinders is illustrated as a cross-sectional view thereof herein. The engine 1 is a cylinder injection type engine designed to inject the fuel directly into the cylinders 3, and lean-burn engine. The engine 1 generates the driving force when an ignition plug 2 ignites the air/fuel mixture in each cylinder 3. For combustion in the engine 1, air, taken in from the outside, flows through an intake path 4, and is mixed with fuel injected from each injector 5 to form an air/fuel mixture. An intake valve 6 is arranged to open and close between the interior of each cylinder 3 and the intake path 4. After burnt inside the cylinder 3, the air/fuel mixture is discharged as exhaust gas to an exhaust path 7. An exhaust valve 8 is arranged to open and close between the interior of each cylinder 3 and the exhaust path 7.

A throttle valve 9, which controls an intake air flow into the cylinders 3, is disposed on the intake path 4. Connected to this throttle valve 9 is a throttle position sensor 10 for detecting an aperture thereof. Along with the throttle valve 9, there are also provided an accelerator position sensor 12 for detecting the step-on position of accelerator pedal 11 and a throttle motor 13 for driving the throttle valve 9. Although not shown in FIG. 1, an intake air temperature sensor for detecting the temperature of intake air is also mounted on the intake path 4.

A surge tank 14 is formed downstream of the throttle valve 9, and a vacuum sensor 15 and a cold start injector 17 are disposed inside the surge tank 14. The vacuum sensor 15 detects the pressure inside the intake path 4 (intake-pipe pressure). The cold start injector 17 is mounted for increasing the cold start response of the engine 1 and for diffusely atomizing the fuel into the surge tank 14 upon a cold start to form the uniform air/fuel mixture.

A swirl control valve 18 is located further downstream of the surge tank 14. The swirl control valve 18 is mounted for generating a steady swirl inside the cylinders 3 during lean combustion (stratified combustion). Along with the swirl control valve 18, there are also provided an SCV position sensor 19 for detecting an aperture of the swirl control valve 18 and a DC motor 20 for driving the swirl control valve 18.

In the engine 1 of the present embodiment the opening/closing timing of the intake valves 6 can be variably controlled by a variable valve timing mechanism 21. The open/close conditions of the intake valves 6 can be detected by a cam position sensor 22 for detecting a rotational position of a cam shaft on which cams for opening/closing the intake valves 6 are mounted. Further, a crank position sensor 23 for detecting a rotational position of a crank shaft is mounted near the crank shaft of the engine 1. It is also possible to determine positions of pistons 24 in the cylinders 3 and the engine speed from output of the crank position sensor 23. The engine 1 is also equipped with a knock sensor 25 for detecting knocking of the engine 1 and a water temperature sensor 26 for detecting the temperature of cooling water.

On the other hand, starting catalysts 27, being ordinary three-way catalysts, are disposed on the exhaust path 7 and near the body of the engine 1. Since the starting catalysts 27 are located near the combustion chambers (cylinders 3) of the engine 1, they are readily heated by exhaust gas. The starting catalysts 27 are arranged to be heated to the temperature of catalytic activity in an earlier stage immediately after starting of the engine and purify toxic substances in exhaust gas. This engine 1 has four cylinders and there are provided one starting catalyst 27 per two cylinders, i.e., totally two starting catalysts 27. Each starting catalyst 27 is equipped with an exhaust-gas temperature sensor 28, and the exhaust-gas temperature sensors 28 detect the temperature of exhaust gas.

The two exhaust pipes are combined into one downstream of the starting catalysts 27 and an NOx-occluding reduction-type exhaust purifying catalyst 39 is disposed there. This NOx-occluding reduction-type exhaust purifying catalyst 39 will be detailed later. An air-fuel ratio sensor 40, which detects an exhaust air-fuel ratio of the exhaust gas flowing into the exhaust purifying catalyst 39, is mounted upstream of the exhaust purifying catalyst 39. The air-fuel ratio sensor 40 applicable herein is either of a linear air-fuel ratio sensor capable of linearly detecting the exhaust air-fuel ratio from the rich region to the lean region, an $O_2$ sensor (oxygen sensor) for determining whether the exhaust air-fuel ratio is in the rich region or in the lean region, on an on-off basis, and so on.

Further, an external EGR (Exhaust Gas Recirculation) path 43 for recirculating the exhaust gas is routed from the exhaust path 7 to the intake path 4. The external EGR path 43 is connected to the surge tank 14 on the intake path 4 side and to an upstream position of the starting catalysts 27 on the exhaust path 7 side. An EGR valve 44 for adjusting an amount of recirculated exhaust gas is disposed on the external EGR path 43. The EGR mechanism recirculates part of the exhaust gas to the intake path 4 by making use of the intake-pipe vacuum in the intake path 4, thereby providing the effect of reducing production of NOx and the effect of improving fuel consumption. It is also possible to use internal EGR control capable of presenting similar effects by controlling the opening/closing timing of the intake valves 6, in combination with the external EGR control.

The fuel stored in a fuel tank 29 is fed out thereof by a low-pressure fuel pump 30 for fuel feed, further is guided through a fuel filter 31, is raised to a high pressure by a high-pressure fuel pump 32, and thereafter is supplied to the injectors 5. This engine 1 is the lean-burnable engine and the condition suitable for the stratified combustion has to be established by directly injecting the fuel into the cylinder 3 in the compression stroke in order to implement a good lean burn (stratified combustion). For this purpose, the fuel is injected from the injectors 5 after raised to the high pressure.

Along with the injectors 5, fuel-pressure sensors 33 for detecting the pressure of the fuel are also provided for execution of precise control. The high-pressure fuel pump 32 increases the pressure of the fuel by making use of the power of the engine 1, i.e., the rotation of the cam shaft on the exhaust valve 8 side. The fuel fed out by the low-pressure fuel pump 30 is supplied in an as-fed state to the cold start injector 17.

Along with the fuel tank 29, there is provided a charcoal canister 34 for collecting evaporative fuel in the fuel tank 29. The charcoal canister 34 has an activated carbon filter inside and this activated carbon filter collects the evaporative fuel. Then the fuel collected is purged into the intake path 4 to be burnt in the cylinders 3, while purge quantity is controlled by a purge control valve 35. The fuel tank 29 is also provided with a return pipe 36 for returning the residual fuel not used in fuel injection, to the fuel tank.

The above-stated ignition plugs 2, injectors 5, throttle position sensor 10, accelerator position sensor 12, throttle motor 13, vacuum sensor 15, cold start injector 17, DC motor 20, actuator of the variable valve timing mechanism 21, cam position sensor 22, crank position sensor 23, knock sensor 25, water temperature sensor 26, exhaust-gas temperature sensor 28, purge control valve 35, air-fuel ratio sensor 40, EGR valve 44, intake-air temperature sensor, and other actuators and sensors are connected to an electronic control unit (ECU) 37 for generally controlling the engine 1.

In the system illustrated in FIG. 1, an electronic control drive unit (EDU) 38 is located between ECU 37 and injectors 5. The EDU 38 is designed to amplify driving current from the ECU 37 to actuate the injectors 5 by large current of high voltage. These actuators and sensors are controlled based on signals from the ECU 37 or send their detection results to the ECU 37. The ECU 37 incorporates a CPU for executing operations, an RAM for saving various information contents such as the results of the operations and the like, a backup RAM whose memory contents are retained by a battery, ROMs storing respective control programs, and so on. The ECU 37 controls the engine 1, based on the various information contents such as the intake-pipe pressure, the air-fuel ratio, and so on.

The NOx-occluding reduction-type exhaust purifying catalyst 39 will be described below.

The exhaust purifying catalyst 39 carries noble metals of platinum, palladium, rhodium, etc. and further carries an alkali metal (K, Na, Li, Cs, or the like), an alkaline earth metal (Ba, Ca, or the like), or a rare earth element (La, Y, or the like) on a carrier having a coating of alumina thin-film layer on its surface, and is designed to be able to occlude NOx included in the exhaust gas when the engine runs at lean air-fuel ratios. For this reason, the exhaust purifying catalyst 39 has the capability of occluding NOx remaining without being reduced in the exhaust gas, in addition to the function as an ordinary three-way catalyst, i.e., the function of purifying HC, CO, and NOx in the exhaust gas with combustion near the stoichiometric air-fuel ratio.

NOx occluded in the exhaust purifying catalyst 39 is released with combustion at rich air-fuel ratios or at the stoichiometric air-fuel ratio to be reduced by HC, CO in the exhaust gas, thus being purified. (At the same time as it, HC and CO are oxidized to be purified.) For this reason, when it is determined that the quantity of NOx occluded in the exhaust purifying catalyst 39 is close to full, there are also cases of forcibly carrying out so-called rich spike operation for running the engine at a rich air-fuel ratio for a short period to reduce the occluded NOx.

The exhaust purifying catalyst 39 has the wall flow structure. The wall flow structure stated herein is a structure having a lot of elongated cells partitioned by porous, thin walls, in which cells opened upstream but closed downstream are arranged next to cells opened downstream but closed upstream and in which the exhaust gas is flowed from the cells opened upstream to the cells opened downstream through the thin walls. In this embodiment, the elongated cells described above are arranged approximately in parallel to the flow direction of the exhaust gas. The wall flow structure is specifically detailed, for example, in Japanese Patent Application Laid-Open No. H09-94434.

The exhaust purifying catalyst 39 has the nature of stably occluding SOx rather than NOx, as described previously, which leads to the SOx poisoning. In the present embodiment, the sulfur component as a source of such SOx poisoning is solidified to reduce the SOx content in the exhaust gas, thereby decreasing the quantity of SOx occluded in the NOx-occluding reduction-type exhaust purifying catalyst 39. This results in increasing the capacity of the exhaust purifying catalyst 39 for the occlusion and reduction of NOx (i.e., NOx occlusion capability), which can increase the purification rate of NOx in the exhaust gas.

For example, there are situations in which the aforementioned rich spike operation is not applicable, depending upon operational states, and thus the NOx occlusion capability of the exhaust purifying catalyst 39 is preferably maintained as large as possible. When the large occlusion capability is ensured, it is feasible to avoid NOx flowing to downstream without being occluded. The sulfur solidifier is used for solidifying the sulfur component.

The sulfur component in the exhaust gas is solidified by the sulfur solidifier (which will also be referred to hereinafter simply as "solidifier"), and the solidification is effected before the exhaust gas flows into the exhaust purifying catalyst 39. In this case, the solidifier can be added into the intake air upstream of the cylinders 3, added into the cylinders, or added to the exhaust gas discharged from the cylinders 3. The solidifier can also be added to the fuel tank or preliminarily added into the fuel (gasoline) immediately before injection.

The solidifier of the present embodiment contains the metal element having the function of oxidizing the sulfur component (which will be also referred to hereinafter simply as "metal element having the oxidizing function") and the basic metal element. Because of the possession of these two components, the solidifier can effectively solidify the sulfur component. Here the effect becomes noticeable when the metal element having the oxidizing function is a transition element. Further, the basic metal element is preferably an alkali metal element or an alkaline earth metal element and is particularly preferably an alkali metal having an atomic number equal to or higher than the atomic number of potassium.

The metal element having the oxidizing function is specifically either of Pt, Pd, Rh, Fe, Ce, In, Ag, Au, and Ir. Among these, the elements except for In are transition elements. On the other hand, the basic metal element is specifically either of Li, Na, K, Rb, Cs, Fr, Be, Mg, Ca, Sr, Ba, Ra, Al, Zn, Zr, and La. Among these, the alkali metals are Li, Na, K, Rb, Cs, and Fr and among these, the alkali metals having their atomic numbers equal to or higher than the atomic number of potassium are K, Rb, Cs, and Fr. The alkaline earth metals are Be, Mg, Ca, Sr, Ba, and Ra.

The solidification of sulfur component is assumed to be effected as follows. (Here the metal element having the oxidizing function is represented by $M_1$ and the basic metal element by $M_2$.) Combustion in the engine 1 produces $SO_2$ and $SO_3$. Then these react as in Formula (1) below.

$$SO_2\text{-}(M_1) \rightarrow SO_3 \rightarrow M_2SO_3 \rightarrow M_2SO_4 \quad (1)$$

When the solidifier contains the metal element having the oxidizing function, as described above, the oxidation reaction of sulfur component becomes easier to take place. Namely, as indicated in above Formula (1), $SO_2$ turns to $SO_3$ easier and it can increase the solidification rate of sulfur. Then sulfur oxide made by oxidation is solidified in the form of a sulfite and a sulfate by the basic metal element.

When the basic metal element is an alkali metal having an atomic number equal to or higher than the atomic number of potassium, the solidification rate of sulfur component can be increased. This is conceivably for the following reason: the alkali metals having their atomic numbers equal to or higher than the atomic number of potassium have strong basicity and are thus easier to be coupled with the sulfur component, and reactions as in Formula (2) below also take place in addition to those in Formula (1) above, so as to increase the solidification rate of sulfur component as a result. (In Formula (2) below, the metal element $M_1$ having the oxidizing function is considered to oxidize the compound $M_2SO_2$ between sulfur dioxide $SO_2$ and the basic metal element $M_2$.)

$$SO_2 \rightarrow M_2SO_2\text{-}(M_1) \rightarrow M_2SO_3 \rightarrow M_2SO_4 \quad (2)$$

Normally, $SO_2$ can be oxidized once to $SO_3$ under high temperatures as during the combustion in the internal combustion engine such as the engine 1, but the chemical equilibrium is established in the mixed state of $SO_3$ gas and sulfur dioxide gas $SO_2$. Without additional occurrence of the reactions in Formula (2) above, the increase cannot be expected in the solidification rate of sulfur. The sulfur oxides SOx can include SO, but it is oxidized into $SO_2$ or $SO_3$ and is thus solidified thereafter as described above.

Figure 6:
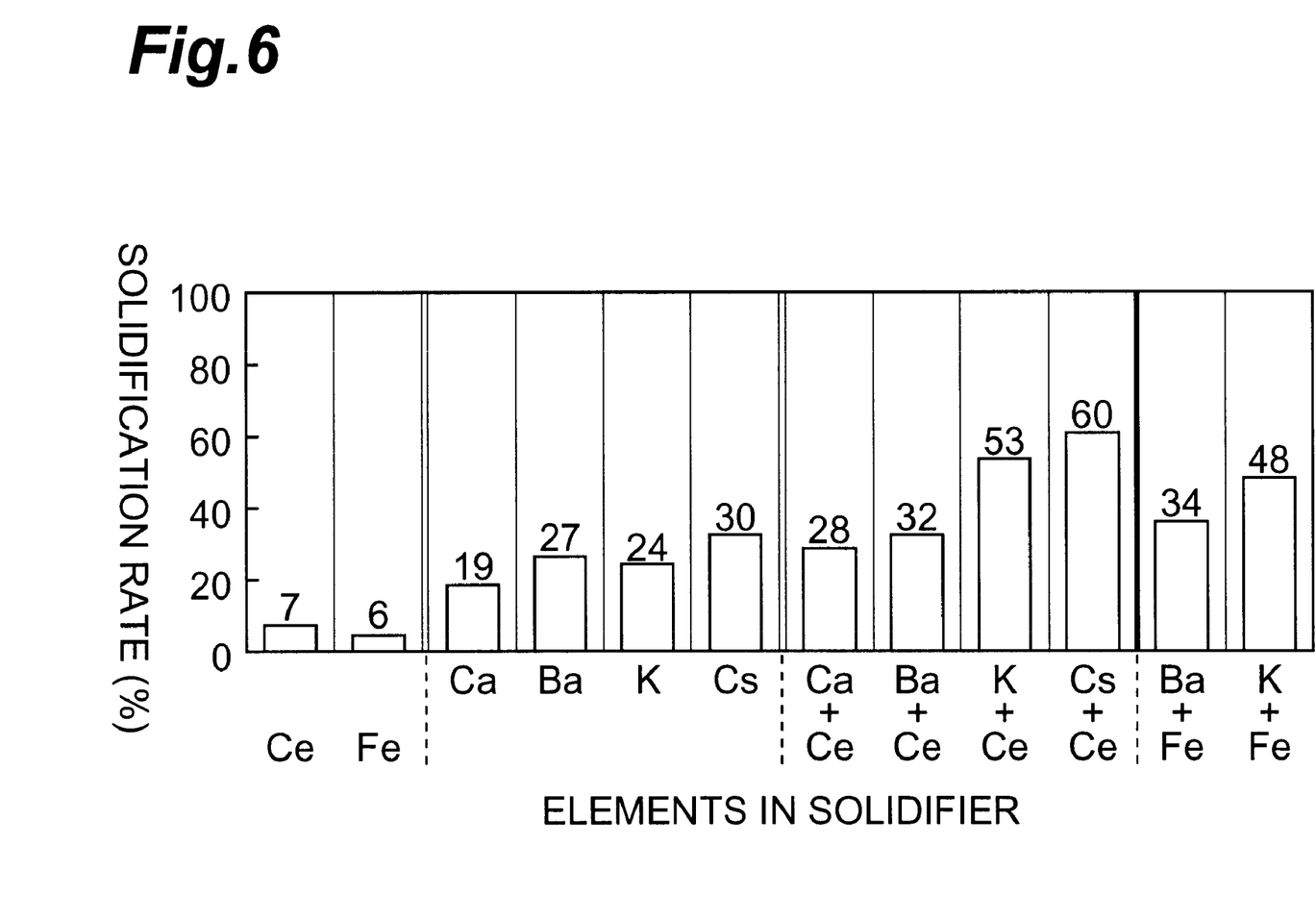
FIG. 6 is a graph to show the relation between elements in the solidifier and solidification rate of sulfur component.

The effect of the solidifier described above was verified by experiment. The experiment was conducted using the test fuel obtained by charging the solidifier into the fuel having the sulfur content of 500 ppm by weight. While the engine was run under the conditions of the engine speed of 2000 rpm and the load of 60 Nm, the SOx content in the exhaust gas was measured and the solidification rate of sulfur component was calculated based on a decrease from the SOx content in the exhaust gas during operation using the normal fuel without the solidifier. The loading amount of the solidifier is calculated from theoretical moles of the sulfur salt ($M_2SO_4$) produced from the basic metal element ($M_2$) included in the solidifier and the sulfur included in the fuel. FIG. 6 shows the solidification rates of sulfur component by the solidifiers containing various elements.

As apparent from FIG. 6, the solidifiers containing only the metal element having the oxidizing function (Ce, Fe) naturally exhibit little effect, because they contain no partner for making a salt. The solidifiers containing only the basic metal element (Ca, Ba, K, Cs) demonstrate the effect of the solidification rate of about 20% to 30% and the solidifiers containing the both elements demonstrate the better effect. Particularly, the solidifiers using the alkali metal element (K, Cs) having the atomic number equal to or higher than the atomic number of potassium as the basic metal show the drastic effect. Further, concerning the metal elements with the oxidizing function (Ce, Fe) used herein, the solidifiers using Ce in combination with the basic metal demonstrated the higher solidification rates. Especially, the combination of Cs+Ce and the combination of K+Ce had the better solidification rate.

Particularly, in order to completely solidify the sulfur component as a source of sulfur oxides by the above-stated solidification reaction, the solidifier needs to contain at least the foregoing basic metal in the amount equal to the chemical equivalent to this sulfur component. It is thus a necessary condition for solidification of all the sulfur component that the solidifier contains a larger amount of the basic metal than the equivalent. If the solidifier contains a smaller amount of the basic metal than the equivalent, it will fail to efficiently solidify the sulfur component.

The equivalent stated herein is moles of the basic metal that can directly react with the sulfur component and is thus the exact amount of the reacting basic metal in the reaction with the sulfur component to form the salt. For example, supposing there is a mole of sulfur component that can produce sulfur oxides after combustion in the engine 1, when the sulfur component is solidified by the above-stated method (e.g., using K as the basic metal), the resultant substance is $K_2SO_4$. This means that two moles of K is necessary for each mole of sulfur component. Namely, in this case, the equivalent of the basic metal is 2 moles of K to one mole of sulfur component.

It is preferable to solidify 70% or more of the sulfur component being the cause of SOx poisoning. The measuring method of solidification rate is as described previously. Namely, a solidification rate is experimentally obtained as a percentage of the solidified to sulfur oxides after combustion in the internal combustion engine. If the solidification rate of the sulfur component included in exhaust gas is below 70%, the rest 30% or more gaseous SOx in exhaust gas will cause the SOx poisoning of the NOx-occluding reduction-type exhaust purifying catalyst in the level that is not different much from heretofore. This is because SOx even at low percentages in exhaust gas can be stably occluded in the exhaust purifying catalyst 39, as described above, and accumulation thereof will decrease the capacity for occlusion of NOx as in the conventional methods.

Although the necessary solidification rate of sulfur component described above is 70% or more, it is preferably not more than 95%. Since solid matter is naturally produced by the solidification of the sulfur component, when the solidification occurs on the intake path 4 or in the cylinders 3, there are apprehensions that the solid matter can be the cause of knocking or combustion failure and that it adheres as deposits near the combustion chambers. It can be also the cause of plugging of the starting catalysts 27 and the exhaust purifying catalyst 39. It can be also predicted that as the solidification rate becomes closer to 100%, the range of improvement in the SOx poisoning of the exhaust purifying catalyst 39 gradually decreases. As a consequence, the solidification rate is preferably not more than 95% in consideration of the SOx poisoning improvement effect relative to the solidification rate and the forgoing apprehensive effects.

Further, in order to enhance the SOx poisoning suppressing effect by increase of the solidification rate (for example, in order to yield the solidification rate of not less than 70% as described above), the number of moles of the solidifier is preferably not less than 1.5 times the number of moles of the sulfur component to be solidified; that is, the solidifier is preferably added by an amount not less than 1.5 times moles of the sulfur component. The number of moles of the solidifier stated herein is the number of moles of the basic metal that can directly react with the sulfur component, in the case of the solidifier described above. This number of moles is calculated based on the definition that an amount equal to one time the moles of the basic metal is the exact amount of the basic metal reacting with the sulfur component to make the salt.

For example, suppose there is one mole of the sulfur component being the cause of SOx poisoning. When the sulfur component is solidified by the aforementioned method (e.g., using K as the basic metal), the resultant substance is $K_2SO_4$. This means that two moles of K is necessary for one mole of the sulfur component. Namely, in this case, 1.5 times the moles of the solidifier (the basic metal element) means that the solidifier contains 1.5×2=3 moles of K.

The solidifier can also react once with NOx on the way of solidification of the sulfur component (SOx such as $SO_2$, $SO_3$, and the like). (However, since nitrates have lower decomposition temperatures than sulfates, the nitrates are considered to be eventually decomposed.) For this reason, if the solidifier is added in the amount equal to the equivalent (one-time moles) to the sulfur component, it will lead to shortage of the solidifier in the solidification of all the sulfur component. It is thus preferable to add the solidifier not less than the equivalent in order to increase the solidification rate of the sulfur component. The reaction products between the solidifier and SOx, NOx are the sulfates and nitrates in which the nitrate ions are monovalent and the sulfate ions are bivalent. The amount of evolving NOx is normally larger than that of evolving SOx, though depending upon the production rate of NOx during combustion. Therefore, the moles of the solidifier (the basic metal element) to be added are preferably at least one and a half times the moles of the sulfur component (among which one time the moles are necessary for the reaction with the sulfur component and half thereof for the reaction with the nitrogen matter).

Figure 7:
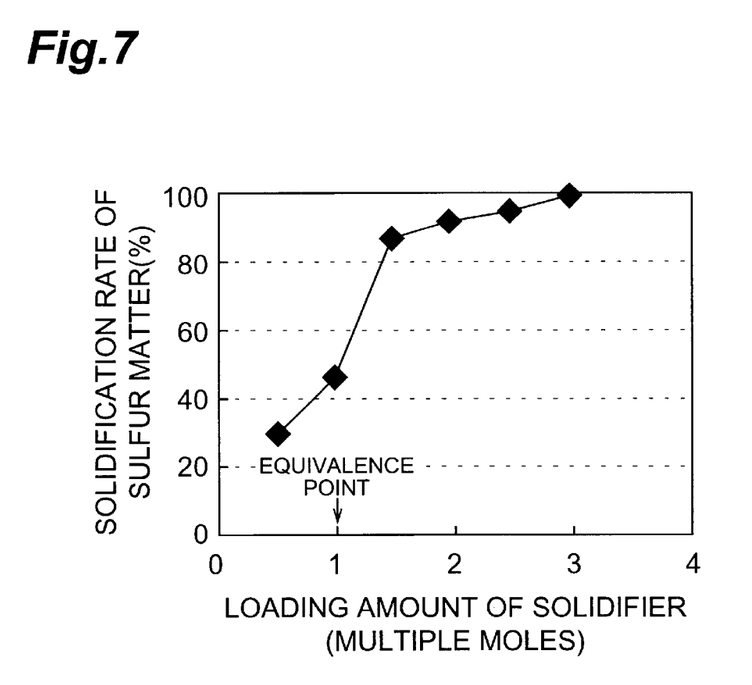
FIG. 7 is a graph to show the relation between loading amount of solidifier and solidification rate of sulfur component.

Here FIG. 7 presents a graph to show a change in the solidification rate of sulfur component against change in the loading amount of the solidifier. The ordinate of the graph illustrated in FIG. 7 represents the solidification rates of sulfur component. The abscissa of the graph illustrated in FIG. 7 represents multiples of the moles of the solidifier, in which by the multiple of 1.5 it is meant that the solidifier is added in the amount equal to 1.5 times the moles of the sulfur component. It is seen from FIG. 7 that the solidification rate of the sulfur component can be maintained in the range of not less than 70% when the loading amount of the solidifier is approximately 1.5 times moles. When 70% or more of the sulfur component in the exhaust gas from the cylinders is solidified, it is feasible to effectively promote the solidification of the sulfur component under high temperature and high pressure during the combustion in the cylinders or immediately after the combustion, which is convenient to increase of the solidification rate.

The solidifier can contain the metal element having the oxidizing function and the metal element with basicity as ions, or as soluble compounds. The solidifier can be solid, liquid, or gas, and the foregoing soluble compounds can be available in various forms, e.g., as solutions thereof in solvent, solids thereof soluble in gasoline of fuel as a solvent, and so on.

For example, it is contemplated that potassium citrate or calcium naphthenate as a compound of the basic metal is dissolved in ethanol to form ions thereof in solution and the solution is added to gasoline being the fuel. It is also contemplated as another example that potassium carbonate, sodium carbonate, or calcium hydroxide as a compound of the basic metal is dissolved in water to form ions thereof in aqueous solution and the aqueous solution is atomized to be added to the intake path, the cylinders, or the exhaust path.

Since most of the sulfur component included in exhaust gas is solidified as described above, the NOx-occluding reduction-type exhaust purifying catalyst 39 becomes resistant to occlusion of SOx and thus the occlusion capacity of the exhaust purifying catalyst 39 can be used by that degree to the occlusion of NOx, which can increase the purification rate of NOx.

Further, the sulfur component thus solidified as described flows into the exhaust purifying catalyst 39 and functions as a catalytic component. Namely, when this solidified sulfur component is held on the exhaust purifying catalyst 39, it becomes a catalyst to reduce NOx and to suppress degradation of the catalytic performance of the exhaust purifying catalyst 39 or supplement the catalytic performance, thereby maintaining the exhaust purifying performance high.

Specifically, the sulfur component reacts with the basic metal to form sulfates and sulfites (solids) and they in that state attach onto surfaces of the internal cells in the exhaust purifying catalyst 39. If the basic metal is separated from the solids thus adsorbed, this basic metal is adsorbed by the exhaust purifying catalyst 39. The exhaust purifying catalyst 39 thus increases the NOx occlusion capability by the degree of new adsorption of the basic metal. Since this adsorption of the basic metal always occurs, the exhaust purifying catalyst 39 becomes kept from deterioration.

When the exhaust purifying catalyst 39 is of the wall flow structure, it becomes easier for the solidified sulfur component to be uniformly held inside the exhaust purifying catalyst 39 and the exhaust gas becomes easier to react with the evaporative basic metal, which can enhance the purification performance of exhaust gas. After the solidified sulfur component is held on the exhaust purifying catalyst, it is placed under high temperature and rich conditions, which can promote the carrying action of the basic metal onto the exhaust purifying catalyst and further enhance the exhaust purifying performance. The solidified sulfur component can be placed under the high temperature and rich conditions, for example, by implementing the so-called rich spike operation.

Further, as described above, the NOx-occluding reduction-type exhaust purifying catalyst 39 carries the alkali metal element or the alkaline earth metal element. (For easier description, the "alkali metal element or alkaline earth metal element" will be referred to simply as "metal element A.") Here the basic metal element included in the solidifier is also the metal element A. Particularly, when the metal element A in the solidifier is one having stronger basicity than the metal element A carried on the exhaust purifying catalyst, gaseous sulfur oxides newly flowing into the exhaust purifying catalyst 39 without being solidified (such gaseous sulfur oxides can be also evolved) are likely to be coupled with the metal element A with the stronger basicity included in the solidifier but unlikely to be coupled with the metal element A carried on the exhaust purifying catalyst from the beginning. As a result, there occurs no degradation of the original NOx occlusion performance of the exhaust purifying catalyst 39 and thus the initial performance of the exhaust purifying catalyst 39 is maintained.

The metal element A newly carried from the solidifier is in a state of flux and its carried amount on the exhaust purifying catalyst 39 can vary depending upon the operational state of the engine 1. Therefore, while the intrinsic NOx occlusion performance of the exhaust purifying catalyst 39 is maintained as much as possible, the NOx occlusion performance added by the metal element A newly carried on the solidifier is utilized like a buffer in a certain sense, whereby the exhaust purifying performance can be maintained high as a result.

Moreover, when the metal element A in the solidifier is one easier to decompose than the metal element A carried on the exhaust purifying catalyst, it is also feasible to prevent the degradation of the occlusion capability of the exhaust purifying catalyst 39. This is for the following reason.

Repetition of occlusion and decomposition-release will result in the phenomenon that the metal element A carried on the exhaust purifying catalyst 39 is scattered in the gas form from the exhaust purifying catalyst 39. If the metal element A newly carried on the exhaust purifying catalyst 39 from the solidifier is easier to decompose than the metal element A carried on the exhaust purifying catalyst 39 from the beginning, the metal element A newly carried from the solidifier will be first decomposed on the occasion of decomposition and thus the scattering phenomenon will start from the metal element A newly carried. As a result, the metal element A carried on the exhaust purifying catalyst 39 from the beginning becomes hard to be scattered and the original NOx occlusion capability of the exhaust purifying catalyst 39 is prevented from degrading, whereby the initial performance of the exhaust purifying catalyst 39 is maintained.

As described above, the metal element A newly carried from the solidifier is in a state of flux and its carried amount on the exhaust purifying catalyst 39 can vary depending upon the operational state of the engine 1. Therefore, the intrinsic NOx occlusion capability of the exhaust purifying catalyst 39 is maintained as much as possible and, in the case of the metal element A being scattered from on the exhaust purifying catalyst 39, the metal element A newly carried from the solidifier is scattered, whereby the intrinsic NOx occlusion capability of the exhaust purifying catalyst 39 is maintained and whereby the exhaust purifying performance can be maintained high as a result.

Specifically, it is contemplated as an example that the exhaust purifying catalyst 39 carries K (potassium) from the beginning and the solidifier contains Cs (cesium) as the alkali metal element (basic metal element). Cs is stronger in basicity and easier to decompose than K. As in this case, the metal element A in the solidifier is preferably one stronger in basicity and easier to decompose than the metal A carried on the exhaust purifying catalyst 39 from the beginning.

As described previously, there are several, conceivable methods for the loading of the solidifier. First, the method of mixing the aforementioned solidifier into the fuel will be briefly described. The aforementioned internal combustion engine of FIG. 1 shows the structure in this case. In this case, the entire engine 1 including the intake/exhaust systems and fuel system functions as solid matter solidifying means for solidification of the solidifier. In this example the basic alkali metal element is potassium and a solution obtained by dissolving potassium citrate in ethanol is used as the solidifier. This solidifier further contains cerium octylate including Ce as a transition metal element having the oxidizing function.

This solidifier is loaded into the fuel tank 29. The loading of the solidifier can be conveniently implemented, for example, immediately after full refueling in the gasoline tank, because it is easy to control the mixture ratio of the solidifier to gasoline of fuel to a predetermined mixture ratio. when the solidifier is added to the gasoline of fuel in this way, the foregoing reaction of solidifying the sulfur component takes place during injection of fuel into the cylinders 3 to cause combustion thereof, whereupon the sulfur component in exhaust gas (which originates in the sulfur component in the fuel or in the engine oil) is solidified, so as not to be occluded in the exhaust purifying catalyst 39.

Figure 2:
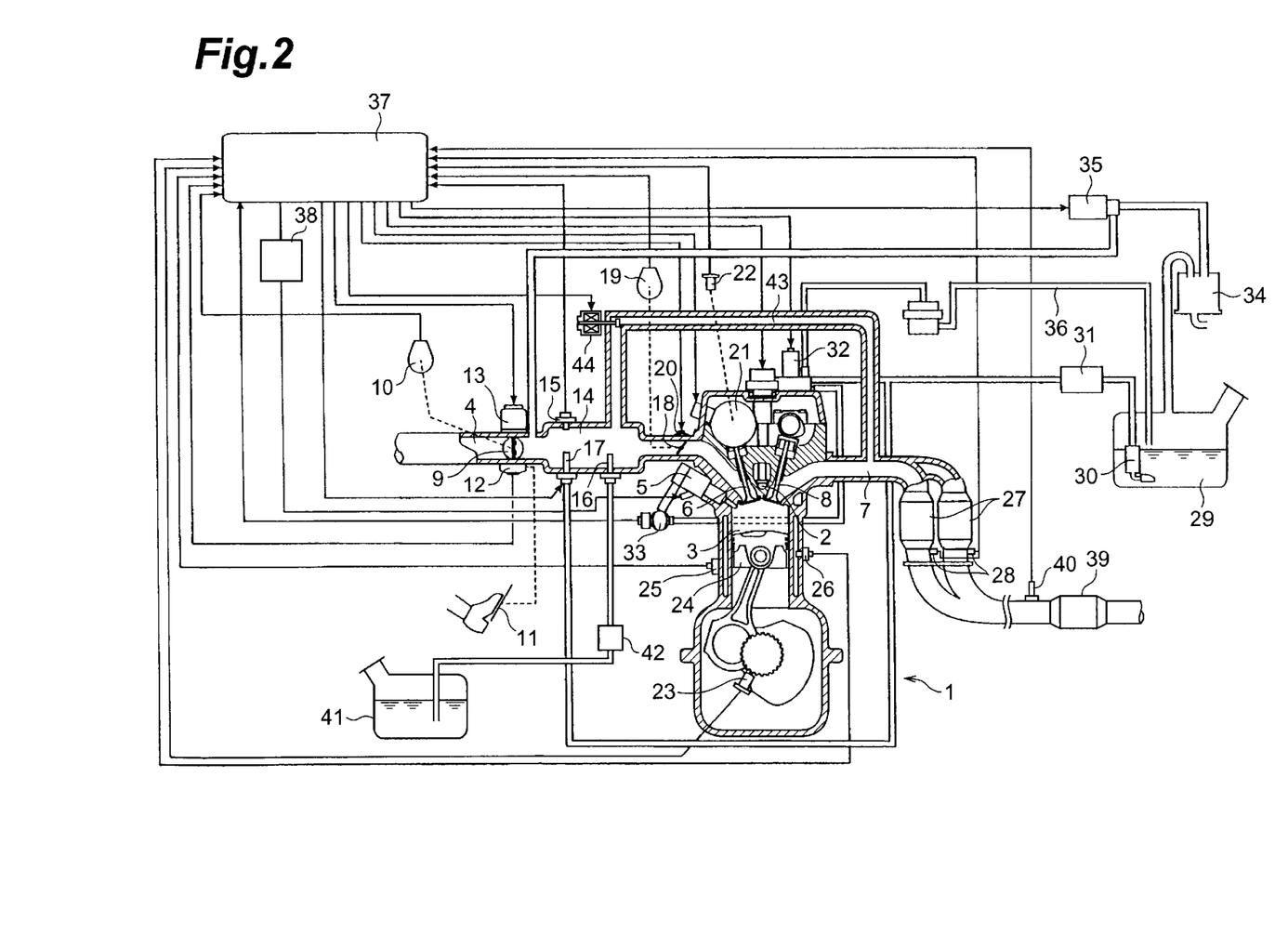
FIG. 2 is a drawing to show the structure of the internal combustion engine and surroundings thereof for carrying out an exhaust purifying method of the present invention (to supply the solidifier onto the intake path).

Next, the method of atomizing the aforementioned solidifier onto the intake path 4 to load the solidifier thereby will be described briefly. FIG. 2 shows the structure of the engine 1 and surroundings thereof in this case. Identical or equivalent constitutive portions to those described above referring to FIG. 1 are denoted by the same reference symbols and detailed description thereof is omitted herein. In this example, the basic alkali metal element is potassium and an aqueous solution of potassium hydroxide is used as the solidifier. This solidifier further contains cerium octylate including Ce as a transition metal element having the oxidizing function.

A solidifier tank 41 for reserving the solidifier is provided along with the engine 1. A pipe is routed from the solidifier tank 41 to the surge tank 14 and an atomizing nozzle 16 for atomizing the solidifier toward the interior of the surge tank 14 is connected to the distal end of this pipe. An atomizing pump 42 for atomization of the solidifier is located in the middle of this pipe. The atomizing pump 42 is driven by electric power of the battery or by part of output of the engine 1. Further, the atomizing nozzle 16 is connected to the ECU 37 described previously and the ECU 37 controls the atomization timing and atomization amount of the solidifier.

When the solidifier is atomized into the intake air by use of the atomizing nozzle 16, it is drawn in that state into the cylinders 3 to be burnt together with the fuel injected from the injectors 5. As a result, the aforementioned reaction of solidifying the sulfur component takes place to solidify the sulfur component in the exhaust gas (which originates in the sulfur component in the fuel or in the engine oil), whereby the sulfur component is prevented from being occluded in the exhaust purifying catalyst 39. In this case, the entire engine 1 including the intake/exhaust systems and fuel system, the atomizing nozzle 16 for supplying the solidifier, the solidifier tank 41, and the atomizing pump 42 function as the sulfur component solidifying means for solidification of the solidifier.

Figure 3:
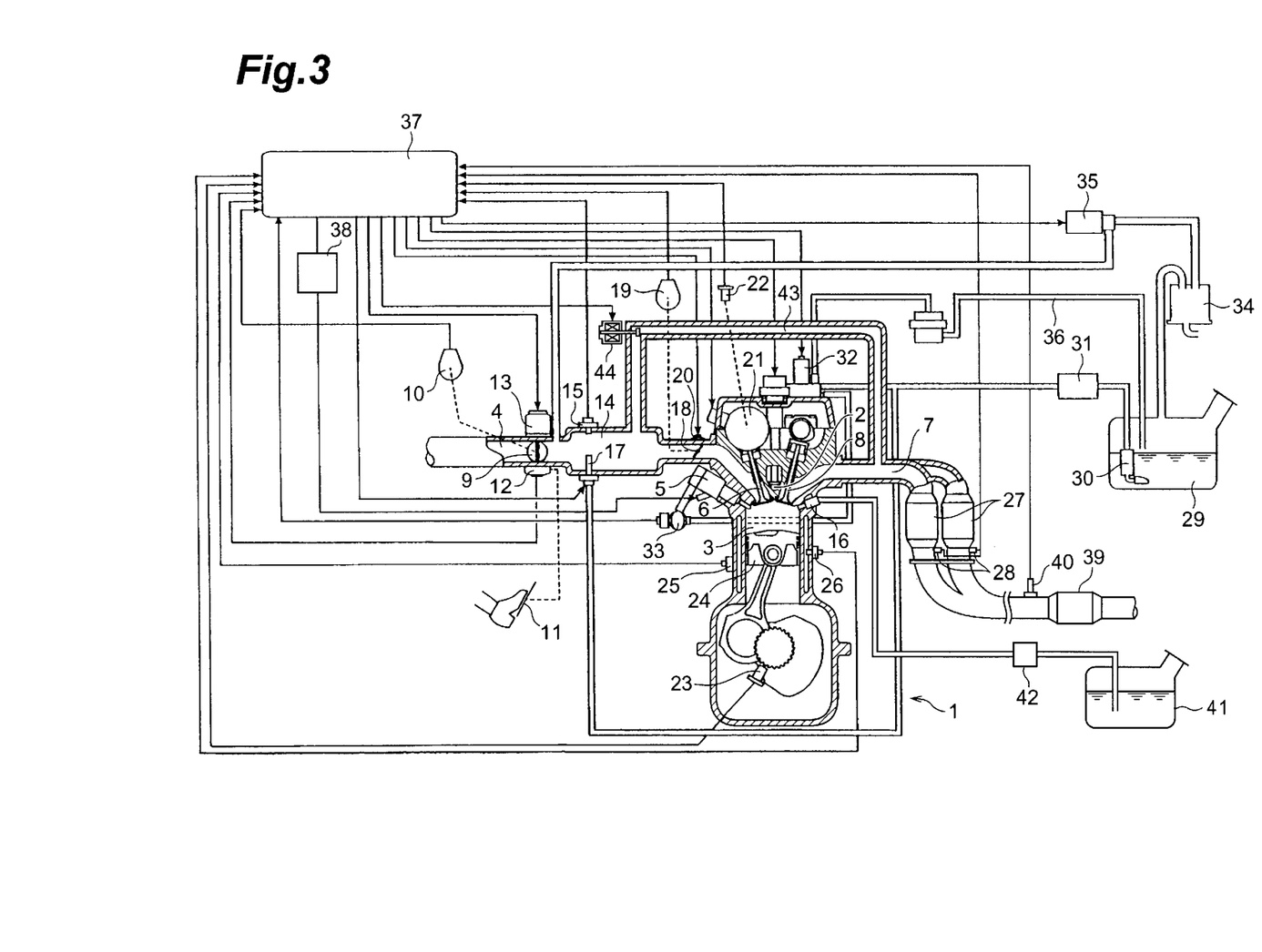
FIG. 3 is a drawing to show the structure of the internal combustion engine and surroundings thereof for carrying out an exhaust purifying method of the present invention (to supply the solidifier into the cylinders).

In the next place, the method of loading the solidifier by atomizing the aforementioned solidifier into the cylinders 3 separately from the gasoline of fuel, will be described briefly. FIG. 3 shows the structure of the engine 1 and surroundings thereof in this case. Identical or equivalent components to those described above referring to FIG. 1 and FIG. 2 are denoted by the same reference symbols and detailed description thereof is omitted herein. In this example, the basic alkali metal element is also potassium and the aqueous solution of potassium hydroxide is used as the solidifier. This solidifier further contains cerium octylate including Ce as a transition metal element having the oxidizing function.

The solidifier tank 41 for reserving this solidifier is provided along with the engine 1. A pipe is routed from the solidifier tank 41 to the cylinders 3 and the atomizing nozzles 16 for atomizing the solidifier toward the interior of the cylinders 3 are connected to the distal end of this pipe. The atomizing pump 42 for atomization of the solidifier is located in the middle of this pipe. The atomizing pump 42 is driven by electric power of the battery or by part of output of the engine 1. Further, the atomizing nozzles 16 are connected to the aforementioned ECU 37 and the ECU 37 controls the atomization timing and amount of the solidifier.

When the solidifier is atomized into the cylinders 3 by use of the atomizing nozzle 16, the aforementioned reaction of solidifying the sulfur component occurs to solidify the sulfur component in exhaust gas (which originates in the sulfur component in the fuel or in the engine oil), whereby the sulfur component is prevented from being occluded in the exhaust purifying catalyst 39. In this case, the entire engine 1 including the intake/exhaust systems and fuel system, the atomizing nozzles 16 for supplying the solidifier, the solidifier tank 41, and the atomizing pump 42 also function as the sulfur component solidifying means for solidification of the solidifier.

For supplying the solidifier into the cylinders 3, there are two ways: supply before combustion and supply after combustion.

In the case of the supply of the solidifier before combustion, the solidifier is supplied during the intake stroke or during the compression stroke. In the case of atomization in the compression stroke, since the solidifier is atomized under high pressure, it is atomized after raised to a high pressure by the atomizing pump 42. When the solidifier is atomized into the cylinders 3 by use of the atomizing nozzles 16, it is burnt after mixed with the intake air and fuel. As a result, the aforementioned reaction of solidifying the sulfur component takes place to solidify the sulfur component in exhaust gas (which originates in the sulfur component in the fuel or in the engine oil).

On the other hand, in the case of the supply of the solidifier after combustion, the solidifier is supplied during the expansion stroke or during the exhaust stroke. When the solidifier is atomized into the cylinders 3 by use of the atomizing nozzles 16, the solidifier reacts with the exhaust gas after combustion to initiate the solidification reaction of the sulfur component in the exhaust gas. As a result, the aforementioned reaction of solidifying the sulfur component takes place to solidify the sulfur component in the exhaust gas (which originates in the sulfur component in the fuel or in the engine oil).

Figure 4:
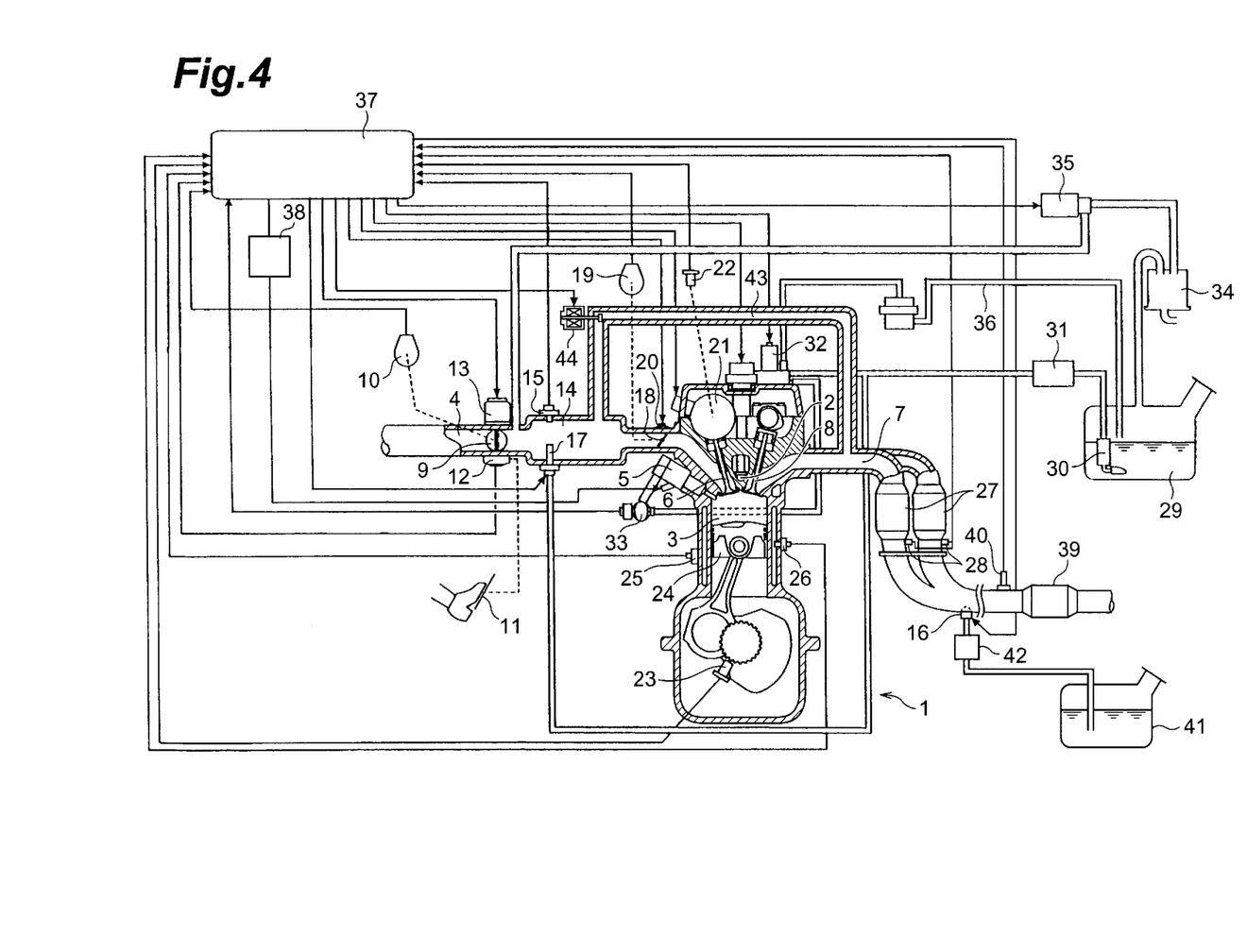
FIG. 4 is a drawing to show the structure of the internal combustion engine and surroundings thereof for carrying out an exhaust purifying method of the present invention (to supply the solidifier onto the exhaust path).

Next, the method of loading the solidifier by atomizing the aforementioned solidifier onto the exhaust path 7, will be described briefly. FIG. 4 shows the structure of the engine 1 and surroundings thereof in this case. Identical or equivalent components to those described above referring to FIG. 1 to FIG. 3 are denoted by the same reference symbols and detailed description thereof is omitted herein. In this example, the basic alkali metal element is also potassium and the aqueous solution of potassium hydroxide is used as the solidifier. This solidifier further contains cerium octylate including Ce as a transition metal element having the oxidizing function.

The solidifier tank 41 for reserving this solidifier is provided along with the engine 1. A pipe is routed from the solidifier tank 41 to the exhaust path 7 and the atomizing nozzle 16 for atomizing the solidifier onto the exhaust path 7 upstream of the exhaust purifying catalyst 39 is connected to the distal end of this pipe. The atomizing pump 42 for atomizing the solidifier is disposed in the middle of this pipe. The atomizing pump 42 is driven by electric power of the battery or by part of output of the engine 1. Further, the atomizing nozzle 16 is connected to the aforementioned ECU 37 and the ECU 37 controls the atomization timing and amount of the solidifier.

When the solidifier is atomized onto the exhaust path 7 by use of the atomizing nozzle 16, the solidifier is mixed with the exhaust gas including the sulfur component, to bring about the aforementioned reaction of solidifying the sulfur component. During this reaction, the heat of the exhaust gas promotes the reaction. This reaction solidifies the sulfur component in the exhaust gas (which originates in the sulfur component in the fuel or in the engine oil) whereby the sulfur component is prevented from being occluded in the exhaust purifying catalyst 39. In this case, the entire engine 1 including the intake/exhaust systems and fuel system, the atomizing nozzle 16 for supplying the solidifier, the solidifier tank 41, and the atomizing pump 42 also function as the sulfur component solidifying means for solidification of the solidifier.

Figure 5:
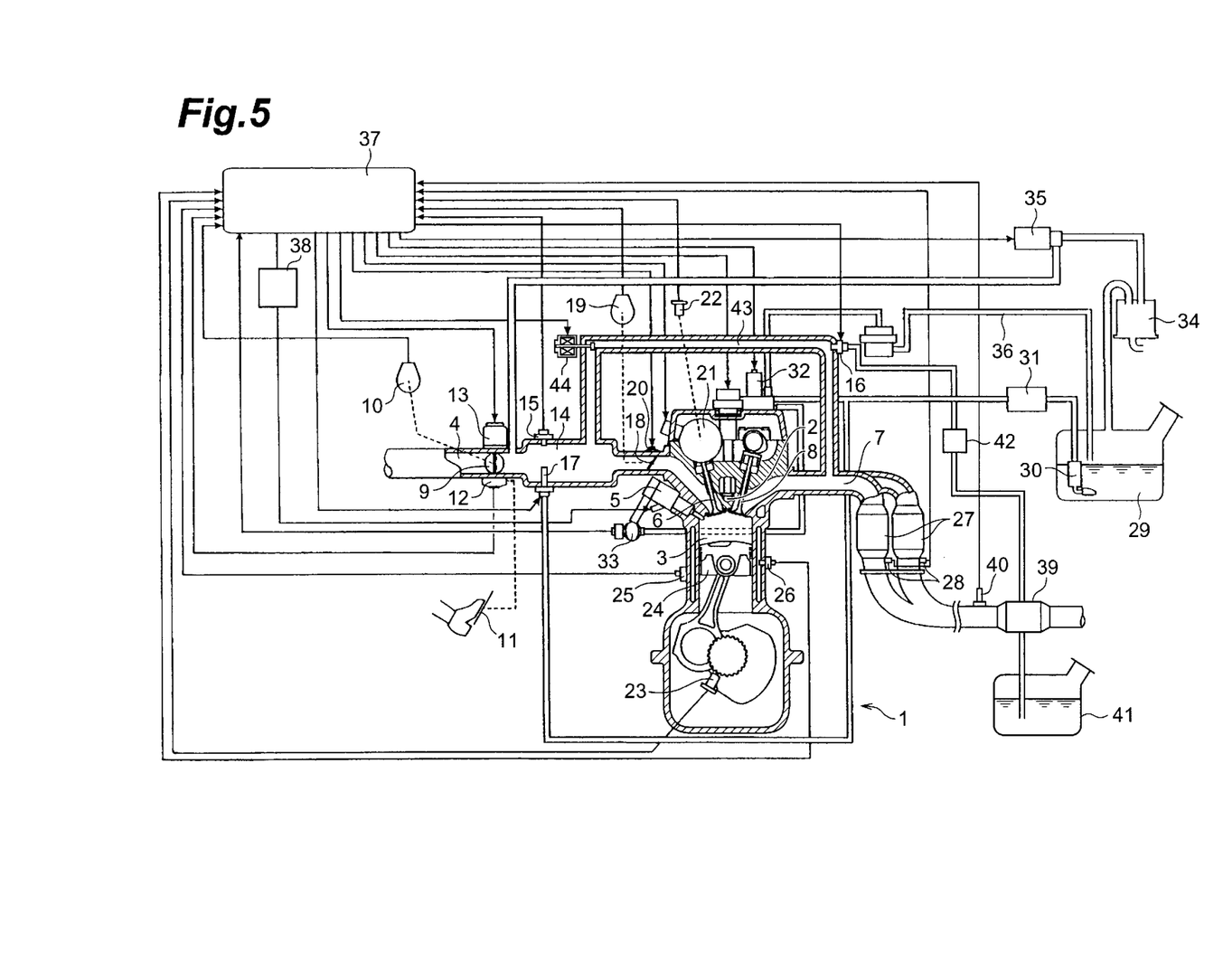
FIG. 5 is a drawing to show the structure of the internal combustion engine and surroundings thereof for carrying out an exhaust purifying method of the present invention (to supply the solidifier onto the EGR path).

Next, the method of loading the solidifier by atomizing the aforementioned solidifier onto the external EGR path 43, will be described briefly. FIG. 5 shows the structure of the engine 1 and surroundings thereof in this case. Identical or equivalent components to those described above referring to FIG. 1 to FIG. 4 are denoted by the same reference symbols and detailed description thereof is omitted herein. In this example, the basic alkali metal element is also potassium and the aqueous solution of potassium hydroxide is used as the solidifier. This solidifier further contains cerium octylate including Ce as a transition metal element having the oxidizing function.

The solidifier tank 41 for reserving this solidifier is provided along with the engine 1. A pipe is routed from the solidifier tank 41 onto the external EGR path 43 and the atomizing nozzle 16 for atomizing the solidifier into the interior on the external EGR path 43 is connected to the distal end of this pipe. The atomizing pump 42 for atomizing the solidifier is disposed in the middle of this pipe. The atomizing pump 42 is driven by electric power of the battery or by part of output of the engine 1. Further, the atomizing nozzle 16 is connected to the aforementioned ECU 37 and the ECU 37 controls the atomization timing and amount of the solidifier.

When the solidifier is atomized onto the external EGR path 43 by use of the atomizing nozzle 16, the solidifier is mixed with the exhaust gas including the sulfur component and is further mixed with the intake air on the intake path 4. The mixture is drawn in that state into the cylinders 3 to be burnt together with the fuel injected from the injectors 5. As a result, the aforementioned reaction of solidifying the sulfur component takes place. This reaction solidifies the sulfur component in the exhaust gas (which originates in the sulfur component in the fuel or in the engine oil), whereby the sulfur component is prevented from being occluded in the exhaust purifying catalyst 39. In this case, the entire engine 1 including the intake/exhaust systems and fuel system, the atomizing nozzle 16 for supplying the solidifier, the solidifier tank 41, and the atomizing pump 42 also function as the sulfur component solidifying means for solidification of the solidifier.

What is claimed is:

1. A method of purifying exhaust gas from an internal combustion engine, comprising the steps of:

loading a sulfur solidifier including a basic metal element for solidifying a sulfur component, into exhaust gas after combustion in a cylinder of the internal combustion engine, to solidify the sulfur component being the cause of SOx poisoning of the exhaust purifying catalyst; and flowing the exhaust gas after solidification of the sulfur component into an NOx-occluding reduction-type exhaust purifying catalyst, wherein SOx poisoning of the NOx occluding reduction-type exhaust purifying catalyst is suppressed, and wherein an oxidation catalyst is placed upstream of said exhaust purifying catalyst on an exhaust path and wherein said sulfur solidifier is loaded into the exhaust gas between said oxidation catalyst and said exhaust purifying catalyst.

2. A method of purifying exhaust gas from an internal combustion engine, comprising the steps of:

loading a sulfur solidifier including a basic metal element and a non-alkali metal element having a function of oxidizing a sulfur component; and utilizing the sulfur solidifier to solidify the sulfur component, which causes SOx poisoning of exhaust purifying catalysts, before exhaust gas flows into an NOx occluding reduction-type exhaust purifying catalyst located on an exhaust path, wherein SOx poisoning of the NOx occluding reduction-type exhaust purifying catalyst is suppressed.

3. The method according to claim 2, wherein said sulfur solidifier is preliminarily mixed in fuel.

4. The method according to claim 2, wherein said sulfur solidifier is loaded on an intake path, in a combustion chamber, or on the exhaust path, separately from fuel.

5. The method according to claim 2, wherein the non-alkali metal element having the function of oxidizing the sulfur component in said sulfur solidifier, is a transition element.

6. The method according to claim 2, wherein said sulfur solidifier includes the basic metal in an amount greater than an equivalent to the sulfur component to be solidified.

7. The method according to claim 2, wherein said metal element having a function of oxidizing the sulfur component is at least one of Pt, Pd, Rh, Fe, Ce, In, Ag, Au, and Jr.

8. The method according to claim 2, wherein the sulfur component solidified is made to be held on said exhaust purifying catalyst and to function as a catalytic component.

9. The method according to claim 2, wherein the basic metal element in said sulfur solidifier is an alkali metal element or an alkaline earth metal element.

10. The method according to claim 9, wherein the basic metal element in said sulfur solidifier is an alkali metal element having an atomic number equal to or higher than the atomic number of potassium.

11. The method according to claim 2, wherein said sulfur solidifier is loaded into intake air, an air/fuel mixture, or recirculated exhaust gas before combustion in a cylinder of said internal combustion engine.

12. The method according to claim 11, wherein said sulfur solidifier is loaded into the intake air, the air/fuel mixture, or the recirculated exhaust gas on the intake path.

13. The method according to claim 11, wherein said sulfur solidifier is loaded into the recirculated exhaust gas on an exhaust gas recirculation path routed from the exhaust path to an intake path.

14. A method of purifying exhaust gas from an internal combustion engine, comprising the steps of:

loading a sulfur solidifier including a basic metal element;

utilizing the sulfur solidifier to solidify a sulfur component, which causes SOx poisoning of exhaust purifying catalysts, upstream of an NOx occluding reduction-type exhaust purifying catalyst located on an exhaust path;

holding the solidified sulfur component on the exhaust purifying catalyst; and making the solidified sulfur component function as a catalytic component, wherein SOx poisoning of the NOx occluding reduction-type exhaust purifying catalyst is suppressed.

15. The method according to claim 14, wherein said exhaust purifying catalyst has a wall flow structure.

16. The method according to claim 14, wherein said sulfur solidifier is preliminarily mixed in fuel.

17. The method according to claim 14, wherein said sulfur solidifier is loaded on an intake path, in a combustion chamber, or on the exhaust path, separately from fuel.

18. The method according to claim 14, wherein the solidified sulfur component to be held on said exhaust purifying catalyst is placed under high temperature and rich conditions after held on said exhaust purifying catalyst, whereby said basic metal element is carried on said exhaust purifying catalyst.

19. The method according to claim 14, wherein said exhaust purifying catalyst carries an alkali metal element or an alkaline earth metal element and the basic metal element in said sulfur solidifier is an alkali metal element or an alkaline earth metal element, and wherein the alkali metal element or the alkaline earth metal element in said sulfur solidifier is stronger in basicity than the alkali metal element or the alkaline earth metal element carried on said exhaust purifying catalyst.

20. The method according to claim 14, wherein said exhaust purifying catalyst carries an alkali metal element or an alkaline earth metal element and the basic metal element in said sulfur solidifier is an alkali metal element or an alkaline earth metal element, and wherein the alkali metal element or the alkaline earth metal element in said sulfur solidifier is easier to decompose than the alkali metal element or the alkaline earth metal element carried on said exhaust purifying catalyst.

* * * * *